United States Patent [19]

Schmidt et al.

[11] Patent Number: 5,006,624

[45] Date of Patent: Apr. 9, 1991

[54] FLUOROCARBON CONTAINING, REACTIVE POLYMERIC SURFACTANTS AND COATING COMPOSITIONS THEREFROM

[75] Inventors: Donald L. Schmidt; Charles E. Coburn; Perry J. McCrackin, all of Midland, Mich.

[73] Assignee: The Dow Chemical Company, Midland, Mich.

[21] Appl. No.: 486,664

[22] Filed: Mar. 1, 1990

Related U.S. Application Data

[60] Division of Ser. No. 402,176, Sep. 1, 1989, Pat. No. 4,929,666, which is a continuation-in-part of Ser. No. 49,490, May 14, 1987, abandoned.

[51] Int. Cl.$^5$ ............................................. C08F 12/30
[52] U.S. Cl. .................................. 526/243; 526/248; 526/250
[58] Field of Search ...................... 526/243, 248, 250

[56] References Cited

U.S. PATENT DOCUMENTS

| | | | |
|---|---|---|---|
| 2,728,749 | 12/1955 | Coover, Jr. et al. | 526/243 |
| 2,995,542 | 8/1961 | Brown | 526/243 |
| 3,078,245 | 2/1963 | Heine | 526/243 |
| 3,207,730 | 9/1965 | Guenthner | 526/243 |
| 3,335,163 | 8/1967 | Tesoro et al. | 526/243 |
| 3,654,244 | 4/1972 | Pittman et al. | 526/243 |
| 3,784,399 | 1/1974 | Grot | 526/243 |
| 3,822,228 | 7/1974 | Petrella et al. | 526/243 |
| 3,884,885 | 5/1975 | Grot | 526/243 |
| 4,329,434 | 5/1982 | Kimoto et al. | 526/243 |
| 4,554,325 | 11/1985 | Schmidt et al. | 526/243 |
| 4,557,837 | 12/1985 | Clark, III et al. | 526/243 |
| 4,840,989 | 6/1989 | Ohst et al. | 526/243 |
| 4,859,754 | 8/1989 | Maekawa et al. | 526/243 |

*Primary Examiner*—Joseph L. Schofer
*Assistant Examiner*—N. Sarofim

[57] ABSTRACT

Water-soluble of water-dispersible, crosslinkable polymeric surfactants having fluorocarbon and ionic moieties are disclosed. Such surfactants can be cured into tough, solvent resistant, low critical surface tension coatings useful for protective finishes on metal, plastics and fabrics.

8 Claims, No Drawings

FLUOROCARBON CONTAINING, REACTIVE POLYMERIC SURFACTANTS AND COATING COMPOSITIONS THEREFROM

CROSS-REFERENCE TO RELATED APPLICATIONS

This is a divisional of application Ser. No. 07/402,176 filed Sept. 1, 1989, now U.S. Pat. No. 4,929,666, which is a continuation-in-part of application Ser. No. 07/049,490, filed May 14, 1987, now abandoned.

BACKGROUND OF THE INVENTION

Compounds and polymers containing highly fluorinated groups are widely used for providing anti-soiling and non-stick properties to surfaces. Presently, applications of fluorocarbon-type coatings require sintering at high temperature or employing undesirable casting solvents. Casting solvents currently in use are frequently costly, highly flammable, and may present potential environmental problems.

U.S. Pat. Nos. 4,592,933; 4,764,564; 4,467,836; and 4,554,325 teach using reactive monomeric surfactants in mixtures of organic/water solutions. These mixed solvent systems are useful for forming relatively thick films (greater than ½ mil) but suffer from two important drawbacks. First, flat films cannot be cast from these formulations since the cast liquids tend to "pull together" causing irregular surfaces. Second, thin, defect-free, glossy coating films are impossible to obtain. Clear, defect-free, glossy films are necessary for the aesthetic appeal required for automobile glazes, counter tops and other consumer uses. The coating compositions of the present invention are functionally distinguished by, among other things, their superior performance over the compositions taught in the existing art.

The present invention relates to a family of crosslinkable, anti-soiling coating compositions derived from polymeric surfactants containing pendant fluorocarbon moieties and pendant chemically reactive ionic moieties. Such surfactants are water-soluble or water-dispersible and can be thermally crosslinked with loss of charge to form tough, solvent resistant, flat, clear, glossy, low critical surface tension coatings on a variety of substrates, such as paint, plastics, metal and fabrics.

SUMMARY OF THE INVENTION

In one aspect, the present invention is a water-soluble or water-dispersible, crosslinkable polymeric surfactant having (1) at least one pendant fluorocarbon moiety and (2) at least one pendant ionic moiety which is capable of chemically reacting with a chemically reactive counterion to form a crosslinked polymer. The reactive ionic moieties on the polymer chain can be (A) anionic, (B) cationic or (C) essentially zwitterionic (having essentially an equivalent amount of both cationic and anionic moieties).

These three classes of polymeric surfactants are conveniently prepared by a variety of methods. For example, anionic polymeric surfactants (Class A) can be obtained from the polymerization of a fluoroaliphatic vinyl monomer (FAVM) with a vinyl carboxylic acid monomer or ethylenically unsaturated carboxylic acid monomer resulting in, after neutralization, an anionic polymeric surfactant. Cationic polymeric surfactants (Class B) can be made by (a) polymerization of a fluoroaliphatic vinyl monomer (FAVM) with a vinylbenzyl chloride monomer or vinyl epoxy monomer followed by conversion to a sulfonium salt via reaction with an organic sulfide, or (b) polymerization of a FAVM with vinyl sulfonium monomer. Either method yields a cationic polymeric surfactant. Essentially zwitterionic polymeric surfactants (Class C) are prepared by polymerization of a vinylbenzyl chloride monomer or a vinyl epoxy monomer with an equivalent amount of a reactive unsaturated carboxylic acid and a FAVM; the benzyl chloride or the epoxide functionality of the resulting terpolymer is then converted to the sulfonium salt by reaction with a sulfide and finally to an essentially zwitterionic terpolymer by reaction of the sulfonium salt functionality with a strong base ion exchange resin.

Zwitterion polymers having an exact equivalent to equivalent ratios of positive to negative ionic groups tend to be water-insoluble. "Essentially zwitterionic" is defined as a polymer containing both cationic and anionic groups but either ion being in excess in sufficient quantity to cause water-solubility or water-dispersibility.

Additionally, the three classes of polymeric surfactants (anionic, cationic and essentially zwitterionic) can be formed by post-reaction of a polymer containing reactive groups with a reactive fluorocarbon-containing moiety to introduce fluorocarbon groups.

The anionic or cationic polymeric surfactants can be crosslinked at moderate temperatures (50° C. to 125° C.) by external crosslinking agents. In some cases thin coatings crosslink at ambient temperatures. An external crosslinking agent is a polyfunctional compound having ionic moiety counterions capable of reacting with the reactive ionic moiety of the surfactant. These external crosslinking agents contain charged or potentially charged (e.g., when the crosslinker is protonated) groups with the charge opposite to the reactive polymer being crosslinked. The essentially zwitterionic type polymeric surfactants are self crosslinking and thus do not require an external crosslinking agent.

A serious disadvantage of conventional water-soluble or dispersible coatings is that they do not easily wet surfaces such as plastics and paints. Thin, hole free, flat coatings cannot be produced unless good wetting is attained. To wet such substrates, liquids, such as water solutions, must be modified by lowering both the surface tension $\gamma_{LG}$ (liquid-gas interface) and the interfacial tension $\gamma_{SL}$ (solid-liquid interface). Wetting will occur if the surface tension (or surface free energy) of the solid-gas interface ($\gamma_{SG}$), is greater than the sum of the surface tensions $\gamma_{LG}$ and interfacial tension ($\gamma_{SL}$), i.e., $\gamma_{SG} > \gamma_{LG} + \gamma_{SL}$. Although, wetting of water-based coatings may be accomplished by addition of a sufficient amount of a conventional monomeric surfactant, this generally results in adhesion loss.

These reactive polymeric surfactants lower both the surface tension $\gamma_{LG}$ and interfacial tension $\gamma_{SL}$ such that they wet most substrates. For example, these polymeric surfactants lower the surface tension of aqueous formulations to between 60 and 40 dynes/cm. Since these reactive polymeric surfactant formulations wet most substrates, they produce thin flat glassy adherent films. Some of these substrates are paints, metals, glass, fabrics and polymers such as polystyrene and polycarbonate. The films can be cured to produce a tough, adherent solvent resistant, low critical surface tension ($\gamma_c$), crosslinked coating. The resultant coatings generally have a critical surface tension of less than 19 dynes/cm, preferably less than 15 dynes/cm. The critical surface tension of wetting of a surface is the surface tension required for a pure liquid to just wet this surface. The lower the critical surface tension the better the anti-soiling properties. For further discussion of critical surface tension see W. A. Zisman, *Adv. Chem. Ser.*, No. 43 (1964).

Thus, the advantages of these coating compositions are:

1. The formulations are water-soluble or water-dispersible.
2. The formulations wet most surfaces and produce, after curing, uniform, hole-free films.
3. Since the cured coatings have low critical surface tensions, i.e., less than 19 dynes/cm, they are anti-soiling and anti-sticking.
4. The coatings cure or crosslink at moderate temperatures, e.g., 50° to 125° C. Some thin coatings will cure at ambient conditions.
5. The crosslinked coatings are both tough and solvent resistant.
6. The coatings are flat, clear and glossy.
7. The coatings adhere to most surfaces.

In summary, the water-soluble, crosslinkable coating compositions spread uniformly on surfaces but convert those surfaces, through the crosslinked coating, to surfaces which are highly unwettable.

Applications for these crosslinkable polymeric surfactants and the resulting coating compositions include soil and stuck-on insect releasing automotive protective finishes and glazes, anti-soiling carpet and fabric treatments, protective coatings for building walls and other construction surfaces, mold release coatings, fly fishing line coatings, wound dressings and the like.

An important advantage of this water-based system is that thin, flat, continuous coatings can be obtained. The surfactant molecule, which causes the liquid formulation to level becomes, with loss of charge, the major part of the final coating. Polymer surfaces, such as polystyrene, polymethylmethacrylate and polycarbonate, are wet by these solutions. Another advantage is these coating formulations are water soluble or water dispersible. Thus, they form homogeneous, thermodynamically stable, micellar, soluble coating formulations. These coatings can be utilized and applied without an organic co-solvent. However, small amounts of organic solvent may be added to aid in curing.

Crosslinking increases the solvent resistance and toughness of the cured films.

The polymers of this invention are prepared by conventional polymerization methods.

As used herein, the term "water-dispersible" refers to any material that will form a stable or metastable mixture with water including a solution, micellular or partially colloidal suspension. "Water-soluble" or "water-dispersible" refers to a casting solvent that contains between zero and 6 percent organic solvents.

Reactive cationic or potentially cationic moieties refer to moieties which will react with reactive anionic groups at conditions not deleterious to the final coating. The reaction of the cationic or potentially cationic moiety with the anionic group is one that results in the formulation of covalent bonds with the extinction or elimination of ionic charge.

DETAILED DESCRIPTION OF THE INVENTION

The reactive polymeric surfactants that are the subject of this invention preferably have an average of more than two reactive, ionic moieties per polymer chain. The charged moiety is covalently bound to the polymer backbone. These charged groups will undergo a reaction which substantially destroys or eliminates the charge with the subsequent formation of covalent crosslinks. Preferably, the polymers bear an average of more than one pendant fluoroaliphatic moiety per polymer molecule.

This class includes polymers with structures that can be represented by the general formula I $$A'[(B)_m(C)_n(D)_o]_p E \qquad (I)$$

A' and E are terminal groups commonly formed from the type of polymerization reaction employed: and B, C, and D are internal covalently bonded groups which can be arranged in any sequence. The subscript m and n are positive integers and the subscript o is a non-negative integer. Typically, the polymer can have number average molecular weights between 2,000 and 200,000; preferably between about 8,000 to 50,000. The subscript p represents the average degree of polymerization.

In formula I, B is

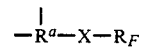

$R^a$ is a saturated trivalent aliphatic radical containing from 2 to 4 carbon atoms. The B group is derived from polymerization of an ethylenically unsaturated monomer. X is a covalently bonded connecting group. $R_F$ is a pendant fluorocarbon moiety.

In Formula I, C is

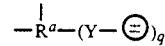

$R^a$ is as previously defined. Y is a covalently bonded connecting group to a reactive, charged moiety, ±, which charge may be either cationic or anionic and may have a counterion: q is 1 or 2. For example, if the charge is negative, the counter ion may be $H^+$ or $NH_4^+$. If the charge is positive, the counter ion could be $HCO_3^-$ or $OH^-$. In the presence of a crosslinker the counter ion may be bound to the crosslinking material. In the case of an essentially zwitterionic polymeric surfactant the ions and counterions would be contained in the same molecule.

In Formula I, D is derived from a non-interfering, hydrocarbon-based polymerizable monomer.

Reactive polymeric surfactants with pendant fluorocarbon moiety, $R_F$, (for example, $-CF_2)_7CF_3$) may be prepared by carrying out a polymerization of a reactive vinyl monomer with a FAVM, such as a fluoroaliphatic acrylate (III), fluoroaliphatic methacrylate (IV) and vinyl aryl type monomers (V, VI), represented by the formulas:

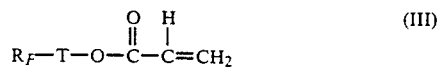

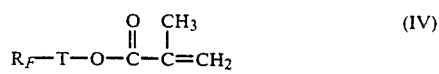

-continued

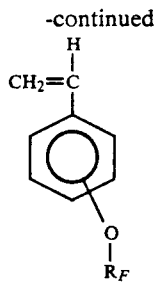 (V)

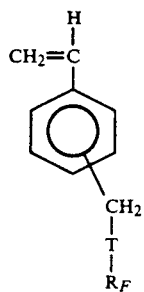 (VI)

The fluorocarbon moiety, $R_F$, must be terminated with at least one $CF_3$ group and contain at least three fully fluorinated carbon atoms which may or may not contain the terminal (furthest removed from the chain) $CF_3$. A perfluorinated $C_nF_{2n+1}$ group where n is 3 to 18 is a preferred $R_F$ group, more preferably n is 4 to 12.

The fluoroaliphatic group of the FAVM is more preferably a saturated, nonaromatic aliphatic radical with at least 3 carbon atoms. The chain may be straight, branched, or if sufficiently large, cyclic. A fully fluorinated group is preferred but hydrogen or chlorine atoms may be present provided that not more than one atom of either is present for every 2 carbon atoms.

A non-interfering hydrocarbon connecting group T is typically present to enhance the chemical and thermal stability of the pendant fluorocarbon moiety group.

T is preferably a divalent hydrocarbon-containing group or an inertly substituted hydrocarbon-containing group wherein the substituents do not deleteriously affect the function of the hydrocarbon group. For example, the T in the formula $R_F$-T may be

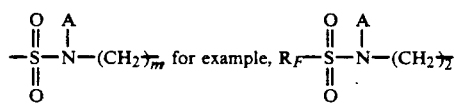

where A is H or an alkyl group (1 to 12 carbon atoms) and m=1 to 10.

The $R_F$ or $R_F$-T pendant group is connected to the polymer backbone, for example a polyacrylate copolymer, represented by

Ⓟ through a linking group, L.

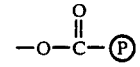

For example, in Formulas I and II above the linking group L is .

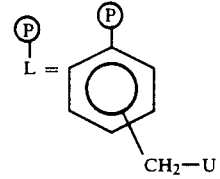

The following table lists some linking groups, L, useful in the present invention.

AROMATIC SYSTEMS where

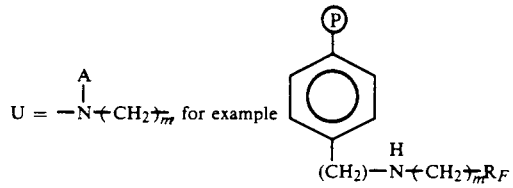

where U is a non-interfering group such as

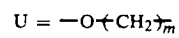

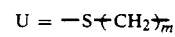

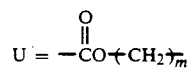

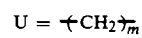

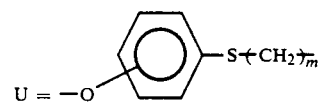

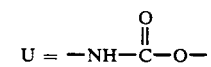

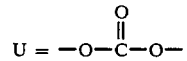

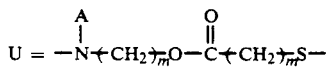

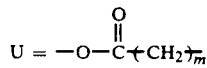

wherein m=zero to 10 and A is H or an alkyl group (1 to 12 carbon atoms).

ALIPHATIC SYSTEMS where

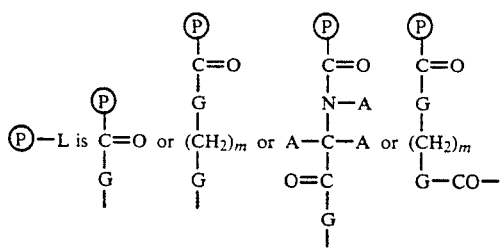

where G is a non-interfering group such as

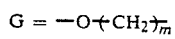

$G = -O(CH_2)_m$

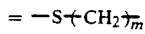

$= -S(CH_2)_m$

$= -N(CH_2)_m$
      $|$
      $A$

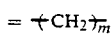

$= (CH_2)_m$

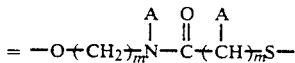

$= -O(CH_2)_mN-C(CH)_mS-$
         $|$  $||$  $|$
         $A$  $O$  $A$ wherein m=zero to 10 and A is H or an alkyl group (1 to 12 carbon atoms).

The fluorocarbon moieties may also be introduced into the polymer by post reaction with a reactive fluorochemical compound. Thus, electrophilic functional groups on the polymer may be reacted with nucleophilic functional fluorocarbon materials. Conversely, electrophilic functional fluorocarbon compounds may be reacted with polymers containing reactive nucleophilic functionality. Pendant fluorocarbon moieties may also be introduced by employing a Michael addition reaction between a polymer-containing pendant double bonds and a reactive nucleophilic fluorocarbon. The double bond may also be attached to the fluorocarbon molecule and be reacted via Michael addition with a polymer containing pendant nucleophilic moieties. Examples of electrophilic functional fluorocarbons are fluorochemical sulfonyl fluoride,

$$R_F-\overset{\overset{O}{\|}}{\underset{\underset{O}{\|}}{S}}-F \quad (VII)$$

or sulfonyl chloride

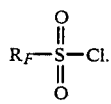

$$R_F-\overset{\overset{O}{\|}}{\underset{\underset{O}{\|}}{S}}-Cl. \quad (VIII)$$

Compounds V and VI may be reacted with polymers containing pendant primary or secondary amines. Amine containing polymers can be conveniently prepared from monomers such as 2-aminoethyl methacrylate or vinylbenzyl amine.

Pendant fluorocarbon groups can also be introduced by reaction of nucleophilic fluorochemical functional amines, $R_F$-T-NHA (where A is H or alkyl), or mercaptants, $R_F$-T-SH, with polymers derived from maleic anhydride or glycidyl methacrylate. The mercapto functional $R_F$ can also react with pendant activated double bonds.

Exemplary of a polymeric surfactant of the present invention is a random polymer having the following formula

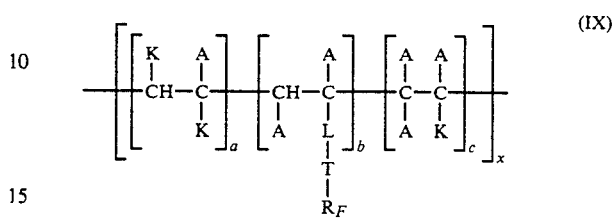

$$\left[\left[\begin{array}{c}K\\|\\-CH-C-\\|\\K\end{array}\right]_a\left[\begin{array}{c}A\\|\\-CH-C-\\|\\A\\|\\L\\|\\T\\|\\R_F\end{array}\right]_b\left[\begin{array}{c}A\quad A\\|\quad|\\-C-C-\\|\quad|\\A\quad K\end{array}\right]_c\right]_x \quad (IX)$$

wherein A is hydrogen, alkyl ($C_1$ to $C_{18}$). cyclic alkyl, phenyl, aryl, or -CN; T is a connecting group as defined above: L is the linking group defined above: K is the ionic moiety as defined herein: $R_F$ is the perfluorocarbon moiety as defined above; and a+b+c=1; and x=5 to 1,000, preferably from 10 to 100. The amount or proportion of b is such that the polymer is water-soluble or dispersible and there is sufficient ionic groups to afford crosslinking. Preferably, the ratio of a +c to b is from 1 to 13, more preferably 1.5 to 4.

The pendant reactive ionic moiety (K) of the polymeric surfactant is the functionality used to interact with a counterion to produce the crosslinking or curing of the polymer. It may be anionic, cationic, potentially anionic or cationic, or have both cationic and anionic functionalities (zwitterionic).

Reactive anionic functionalities, K, are generated by reaction of carboxy, mercaptant or sulfonamide moieties with bases to obtain the carboxylate mercaptide and sulfonamide salts. At lower pH values, these functionalized polymers of type VII become essentially nonionic, are generally water insoluble, and thus no longer act as surfactants. Examples of anionic moieties, K, include (wherein G is as previously defined)

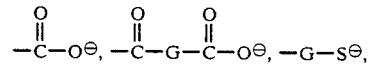

$$-\overset{\overset{O}{\|}}{C}-O^{\ominus}, \quad -\overset{\overset{O}{\|}}{C}-G-\overset{\overset{O}{\|}}{C}-O^{\ominus}, \quad -G-S^{\ominus},$$

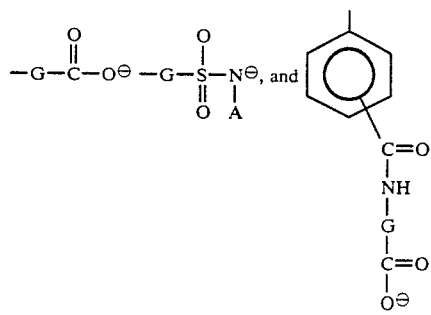

The preferred anionic moiety, K, is carboxylate.

Reactive cationic functionalities, $K_s$ are not strongly affected by pH and include sulfoniums and reactive cyclic quarternary ammonium moieties. Examples of cationic functionalities are:

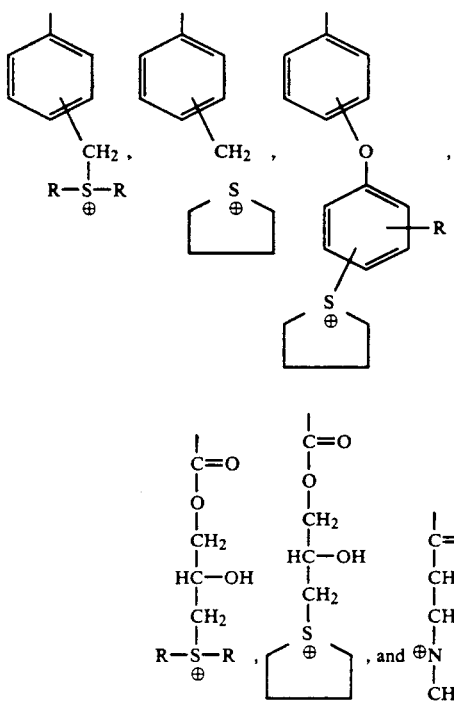

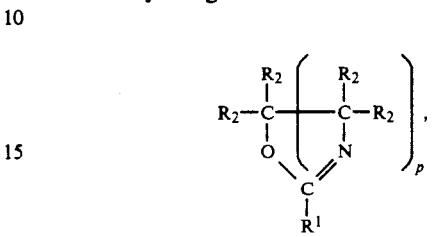

wherein p=1 or 2, $R_1$ is an acyclic organic radical having addition polymerizable unsaturation. Preferably, $R_1$ is an isopropenyl group. Each $R_2$ is independently hydrogen, halogen or an inertly substituted organic radical, preferably $R_2$ is hydrogen.

A polyfunctional oxazoline may also be represented by the general structure:

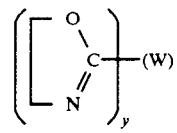

wherein W is a noninterfering hydrocarbon or inertly substituted connecting group having a valance of y.

Other crosslinker systems for anionic polymeric surfactants are, for example, functional epoxy or melamine-based compositions which when protonated yield a cationic functionality.

Polymeric surfactants containing cationic moieties can be prepared by, for example, reacting a perfluorocarbon acrylate compound with a vinylbenzyl chloride to produce a polymeric perfluorocarbon compound which is then functionalized by reacting with dimethyl sulfide to produce the perfluorocarbon-containing polymeric surfactant having a sulfonium ion functionality.

Reactive cationic polymeric surfactants can be crosslinked by nucleophilic anions such as bicarbonate, carbonate and water compatible polyfunctional carboxylate moieties. A polyfunctional carboxylate may be represented by the general structure Crosslinking of an anionic reactive polymeric surfactant can be attained by using a reactive cationic or potential cationic external counterion. The counterion can be a polyfunctional cation such as benzylsulfonium, aryl cyclic sulfonium (cf. U.S. Pat. No. 3,903,056) or azetidinium as the $CO_3$= or $HCO_3$-salt. The carboxylate anionic polymeric surfactant usually is introduced as the ammonium salt. Thus, when the solvent is removed, $NH_3$ is evolved and the resulting carboxy acid functionality reacts with the oxazoline to form covalent bonds.

If a cyclic sulfonium zwitterion (cf. U.S. Pat No. 3,804,797) is used as a crosslinker, coacervation does not take place.

The preferred potentially cationic crosslinking agent for the anionic carboxylate polymeric surfactant is a polyfunctional oxazoline or oxazine. For example, polymers of 2-isopropenyl-2-oxazoline can be formulated with the ammonium salt of a carboxylate anionic polymeric surfactant. With the removal of solvent and ammonia, the oxazoline nitrogen is protonated and the resultant onium-carboxylate ion pair intermediate is converted to an amide-ester crosslink. This is shown by the reaction below.

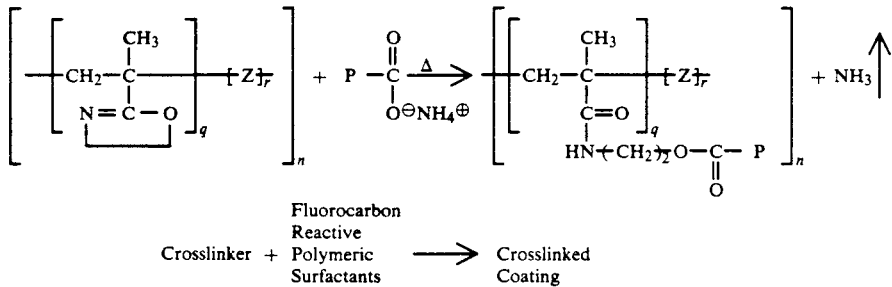

Crosslinker + Fluorocarbon Reactive Polymeric Surfactants → Crosslinked Coating wherein P is a Formula VII polymer where K is $COO^\ominus NH_4^{61}$, Z is independently a hydrophilic monomer (such as methacrylic acid), a hydrophobic monomer (such as methyl methacrylate) or a combination thereof, incorporated in an amount which does not interfere with the compatibility of the polymer and the water based system, and q+r=1. The above example is shown with ammonia but other cations capable of producing a volatile amine can be used.

The polyfunctional oxazoline may be obtained by addition polymerization of an oxazoline monomer represented by the general structure:

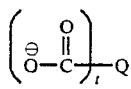

wherein Q is a noninterfering or inertly substituted connecting group having a valence of t. The connecting group Q can contain alkyl, cyclic alkyl, aromatic, ether, ester, amide carbonate, urea or urethane linking groups. Examples of polyfunctional carboxylate crosslinking moieties are:

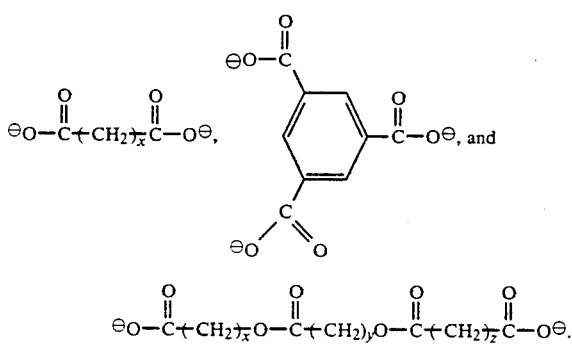

wherein x, y and z are each zero to 25.

The polymeric surfactant can also be prepared so as to contain both anionic and cationic pendant functionalities, e.g., an essentially zwitterionic surfactant or so-called inner salt. These are self curing and need no external reactive crosslinking agent.

By using the polymeric surfactants of the present invention, coating compositions are obtained which are water based, wettable on most substrates, and curable at comparatively low temperatures, e.g., 50° to 125° C. The resultant crosslinked coatings are uniform, thin, clear, glossy, have comparatively low critical surface tension, are solvent resistant and have excellent adhesion to most substrates.

As a further embodiment of the present invention, a compatible hydrocarbon based polymeric surfactant or a compatible latex-based coating composition can be added to the crosslinkable coating composition to tailor or adjust the surface properties of the crosslinked coating without significant detrimental effect on the wetting properties of the original uncrosslinked composition. For example, a reactive hydrocarbon-based polymeric surfactant which is water-soluble, is miscible in the crosslinkable coating composition, and does not contain a fluorocarbon moiety, can be added to the fluorocarbon moiety/ionic moiety containing reactive polymeric surfactant and corresponding crosslinking agent. Alternatively, the fluorocarbon moiety/ionic moiety containing reactive polymeric surfactant can be added to a conventional hydrocarbon-based reactive polymeric surfactant system which contains a crosslinker for the hydrocarbon surfactant which will also serve as a crosslinker for the fluorocarbon moiety/ionic moiety containing polymeric surfactant.

The proportions of the two surfactant components can vary with the properties desired. Preferably, the amount of hydrocarbon surfactant is greater than the amount of fluorocarbon moiety/ionic moiety surfactant, most preferably the weight ratio is from about 5 to 1 to about 20 to 1. The fluorocarbon moiety/ionic moiety surfactant will contribute to the wettability of the uncrosslinked system, i.e.. produce a thin, uniform coating, and to lower the critical surface tension of the resultant crosslinked coating. The hydrocarbon based surfactant will provide the base physical properties for the crosslinked coating, e.g., hardness. In this way thin, hard, uniform, adherent coatings can be achieved using reactive hydrocarbon based polymeric surfactants as the base polymer, i.e, the fluorocarbon/ionic polymeric surfactant of the present invention is used as a beneficial additive.

Such three component systems achieve low critical surface tension coatings with reduced fluorine content (lower cost), the same physical properties, e.g., hardness (from the base hydrocarbon polymer), and potentially enhanced adhesion over an all fluorocarbon/ionic polymeric surfactant system. Apparently, the fluorocarbon/ionic polymeric surfactant migrates to the vapor phase surface, i.e., the surface of the coating away from the substrate. Thus, the coating is able to maintain its non-stick, anti-soiling character with significantly reduced fluorine levels. Surprisingly, the fluorocarbon-/ionic polymeric surfactant distributes uniformly on the surface of the resulting coating. Physical properties come from the bulk, hydrocarbon based phase, thus enabling one to select the desired property combination by use of a particular hydrocarbon based polymeric surfactant or latex system. As with the all fluorocarbon-/ionic polymeric surfactant system a variety of crosslinkers can be employed to cure the coating composition.

The following examples are representative of the polymeric surfactants and coating compositions of the present invention.

EXAMPLE 1

Preparation of Anionic Polymeric Surfactants

A perfluorocarbon-containing polymeric surfactant was prepared having a pendant carboxylate functionality. Polymerization was carried out in a 250 ml, 3-necked, round bottom flask equipped with an overhead stirrer, condenser, pressure equalizing addition funnel and nitrogen inlet. The reaction flask was charged with 25 g of MEK, stirred, heated to 85° C. and purged with nitrogen. To the funnel was added 40 g of a perfluorinated methacrylate compound (Zonyl TM ®, made by duPont, after inhibitor removal) and 10 g of methacrylic acid (MAA) along with 5 g additional MEK. The mixture of monomers was added to the reaction flask at the rate of 3.5 ml per 15 minutes. 1.2 Grams of initiator (Vazo-64, α,α-azobisisobutyronitrile, manufactured by duPont) was added to 12 ml of MEK and the solution was cooled to 0° C. and added at the rate of 1 ml per 15 minutes to the reaction mixture. After the additions were completed, the reaction mixture was held at 85° C. for an additional three hours. The reaction mixture was allowed to cool to ambient temperature and the solvent removed under vacuum leaving a white powder form of a polymer having pendant perfluorocarbon moiety and pendant carboxy functionality. The solid powder was dissolved into an aqueous ammonium hydroxide solution. The residual ammonium hydroxide was removed under vacuum and the polymer dialyzed overnight utilizing Spectro-Por dialysis tubing with a molecular weight cut off of 8,000 (Example 1).

EXAMPLE 2

Oxazoline Crosslinker For Anionic Polymeric Surfactants

A sample of Example 1 (0.2 g of a 7.06 percent solids) was made basic by the addition of one drop of concentrated ammonium hydroxide and then admixed with 0.076 g of a 5 percent solids aqueous solution of 2-isopropenyl-2-oxazoline homopolymer. To the mixture was added 0.05 ml of alcohol and 0.6 ml of water. This solution was mixed and applied to glass slides. These coated slides were cured at 125° C. for one hour resulting in clear, colorless, and smooth thin films. The film was analyzed for its critical surface tension of wetting value using a homologous series of seven n-hydrocarbons. The measured critical surface tension of wetting was 13.1 dynes/cm.

Other Example 1 coating composition samples were cured at lower curing temperatures. Curing conditions as low as 60° C. for one-half hour were sufficient to cure the composition into a thin, hard, colorless film. Such a ½-hour, 60° C. cure gave a coating with a critical surface tension of 13.4 dynes/cm. Essentially the same result was obtained when the same composition was cured at 60° C. for 12 hours (critical surface tension of 13.5 dynes/cm) and one cured at 80° C. for 1/2 hour (critical surface tension of 13.8 dynes/cm).

Other Example 1 coating compositions were made into films in accordance with Example 2 and tested for UV radiation stability. If a film is stable to UV, the change in critical surface tension will be relatively small. A film prepared from Example 1 composition had an initial critical surface tension of 13.8 dynes/cm. After 1,000 hours of UV radiation exposure using a Weather-o-meter and a Fade-o-meter, the critical surface tension increased only to 16.0 dynes/cm indicating good UV stability.

EXAMPLE 3

In a similar manner to Example 1, polymeric surfactants were prepared having pendant fluorocarbon moieties and chain-extended carboxylate moieties. For example, a copolymer comprised of 60 weight percent Zonyl TM ® (manufactured by duPont) and 40 weight percent B-CEA ® (a side chain pendent carboxylate compound, sold by Alcolac) was prepared, deprotonated, and formulated with poly-isopropenyloxazoline. This solution was then used in a similar manner to Example 2 to prepare clear, colorless, hard, and smooth thin films. The measured critical surface tension of wetting was 12.5 dynes/cm.

EXAMPLE 4

Cyclic Sulfonium Zwitterion as Crosslinker For Anionic Polymeric Surfactant

A sample of Example 1 (0.2 g of a 7.06 percent solids) was admixed with 0.0235 g of a 28 percent solids aqueous solution of the cyclic sulfonium zwitterion. To the mixture was added 0.25 ml of isopropanol and 1.0 ml of distilled water. This solution was mixed and applied to glass slides. These coated slides were cured at 125° C. for one hour resulting in clear, colorless, and smooth thin films. The measured critical surface tension of wetting was 12.9 dynes/cm.

EXAMPLES 5-8

Anionic Polymeric Surfactants—Oxazoline Crosslinker

In a similar manner to Example 1, polymeric surfactants were prepared having pendant fluorocarbon moieties and carboxylate moieties employing different percentages of the perfluorinated acrylate or methacrylate compound and methacrylic acid. The following table reports the type and relative proportions of the monomers and the resulting critical surface tension of wetting for the resultant coatings which were measured in the same manner as Example 2.

TABLE I

| Example | Perfluorocarbon | Acid | Wilkinson Pencil Hardness Test | Critical Surface Tension (dynes/cm) |
|---|---|---|---|---|
| 5 | 60 wt. % methacrylate | 40 wt. % MAA | >6H | 16.0 |
| 6 | 90 wt. % methacrylate | 10 wt. % MAA | 2H | 14.5 |
| 7 | 80 wt. % acrylate | 20 wt. % MAA | >6H | 14.0 |
| 8 | 90 wt. % acrylate | 10 wt. % MAA | 3H | 12.9 |

Samples of the surfactants of Examples 2, 3, and 5-8 were taken and the surface tension of the polymeric surfactant solutions (without crosslinker) was determined at the critical micelle concentration (CMC). Table II presents the results.

TABLE II

| Example | Perfluorocarbon | Acid | CMC (wt. %) | Surface Tension at CMC (dynes/cm) |
|---|---|---|---|---|
| 2A | 80 wt. % methacrylate | 20 wt. % MAA | 1.5 | 48 |
| 3A | 60 wt. % methacrylate | 40 wt. % pendant carboxylate | 2.0 | 46 |
| 5A | 60 wt. % methacrylate | 40 wt. % MAA | 2.5 | 54 |
| 6A | 90 wt. % methacrylate | 10 wt. % MAA | >10 | <38 |
| 7A | 80 wt. % acrylate | 20 wt. % MAA | 0.15 | 37 |
| 8A | 90 wt. % acrylate | 10 wt. % MAA | 0.6 | 30 |

EXAMPLE 9

Di-functional Oxazoline as Crosslinker

In a manner the same as Example 2, a coating composition was prepared and tested utilizing the polymeric surfactant of Example 1 and a dioxazoline crosslinker of the following formula:

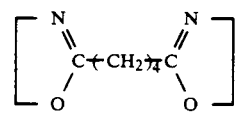

The crosslinker was made in accordance with Witte, H and Seeliger, W; *Angew. Chem. International Edition*, Vol. 11, No. 4, 1972, p. 287-288.

The resultant cured coating had a critical surface tension of 13.3 dynes/cm.

EXAMPLE 10

Preparation of a Reactive Cationic Surfactant Polymer

To a 250 ml, 3-necked, round-bottom flask equipped with a 125 ml pressure equalizing addition funnel, an overhead air-driven stirrer, a condenser, and a nitrogen inlet was added 15 grams (g) of methyl ethyl ketone (MEK). This was stirred and heated to reflux (about 85° C.) while the system was under a nitrogen atmosphere. The addition funnel was then charged with a mixture of 30 g of a perfluoroacrylate (FX-18, manufactured by 3-M Company) and 20 g of vinylbenzyl chloride in MEK (5 g), i.e., 60 weight percent perfluoroacrylate and 40 weight percent vinylbenzyl chloride. The monomers were then added to the reaction vessel at the rate of 4 ml per 15 minutes. A solution of initiator (Vazo-64) consisting of 1.2 g in 12 ml of MEK was cooled to 0° C. and added to the reaction vessel at the rate of one milliliter per 15 minutes. Once these additions had been completed the reaction mixture was allowed to continue to stir at 85° C. for an additional three hours. During this time an additional amount of MEK (10 g) was added. The reaction mixture was allowed to cool to ambient temperature and the polymer containing solution decanted away from the trace solid polymer residue.

The perfluoroacrylate/vinylbenzyl chloride copolymer (reaction product) was further reacted with dimethyl sulfide. To a 50 ml round-bottom flask equipped with a magnetic stirrer, a condenser, a dry ice condenser and a nitrogen inlet was added 11.3 g of the perfluoroacrylate/vinylbenzyl chloride copolymer as a 45.4 percent solution in MEK and 4.2 g (5 eq.) of dimethyl sulfide. This mixture was further diluted with 10 g of a 1:1 THF/MEK solvent blend and heated to 50° C. for 24 hours. During this time, small amounts of water were periodically added (total amount about 3 ml) to increase the polarity of the solvent system. Upon completion of the reaction, the reaction mixture was allowed to cool to ambient temperature and the excess solvent removed in vacuo. To the solid product was added a 33 percent acetone/67 percent water (by volume) solvent system. The mixture was stirred for one hour resulting in a clear, tan solution of the sulfonium chloride salt of the perfluorocarbon-containing polymer (Example 10).

Preparation of Coatings From the Reactive Cationic Surfactant Polymer

The solution of Example 10 was then loaded into a column packed with bicarbonate anionic exchange resin and the bicarbonate salt was formed from the chloride salt to introduce the counterion crosslinking agent.

The bicarbonate form of the polymeric surfactant of Example 10 was briefly subjected to reduced pressure to remove the organic solvents and then dialyzed for 24 hours utilizing Spectro-Por dialysis tubing with a molecular weight cut off of 8,000. A 3.3 percent aqueous solution of this polymeric surfactant was applied to a clean glass slide. The coated slide was then allowed to cure at 125° C. for 45 minutes to crosslink the coating. The resulting thin film was clear, colorless and smooth. The film was analyzed for its critical surface tension of wetting. Using a homologous series of seven N-hydrocarbons, the critical surface tension value measured was 13.6 dynes/cm.

EXAMPLES 11-12

Preparation of Cationic Polymeric Surfactant Coatings

In the same manner as Example 10, samples were prepared from a 50 weight percent perfluoroacrylate (FX-189, made by 3M) and 50 weight percent vinylbenzyl chloride (Example 11) and a 50 weight percent perfluoronated methacrylate (Zonyl T made by duPont, after the inhibitor was removed) and 50 weight percent vinylbenzyl chloride (Example 12). The coatings had the same physical characteristics and a critical surface tension of wetting 13.6 dynes/cm (Example 11) and 13.2 dynes/cm (Example 12).

EXAMPLES 13-14

Crosslinking Agents For Cationic Polymeric Surfactants

The sulfonium chloride salt perfluorocarbon-containing polymeric surfactant of Example 10 was reacted with malonic acid (Example 13) and a long-chain difunctional acid (Empol 1010 dimer acid made by Emery Corporation) (Example 14) to incorporate the counterion crosslinking agent The resulting coating compositions were applied to clean glass slides and cured in the same manner as Example 10. The crosslinked coatings were clear, colorless and smooth. The critical surface tension of wetting for both coatings was 13.8 dynes/cm.

EXAMPLE 15

Preparation of the Zwitterionic Terpolymer

A perfluorocarbon-containing zwitterionic terpolymer was prepared having pendant carboxylate and sulfonium functionality. Polymerization was carried out in a 250 ml, 3-necked round bottomed flask equipped with an overhead stirrer, condenser, pressure equalizing addition funnel and nitrogen inlet. The reaction flask was charged with 65 g of MEK, stirred, heated to 85° C. and placed under a nitrogen atmosphere. To the funnel was added 25 g of a perfluorinated methacrylate compound (Zonyl TM, made by duPont, inhibitor free), 9 g of methacrylic acid (MAA) and 16 g of vinylbenzyl chloride (VBC) along with 60 g of additional MEK. The mixture of monomers was added to the reaction flask at the rate of 9 ml per 15 minutes. 1.2 Grams of initiator (Vazo-64) was added to 20 g of MEK, the resulting solution cooled to 0° C. and then was added simultaneously with the mixture of monomers to the reaction flask at the rate of 2 ml per 15 minutes. After the additions were complete, the reaction mixture was held at 85° C. for an additional 2.5 hours. The reaction mixture was allowed to cool to ambient temperatures resulting in a yellow solution, 176 g, 21.3 percent solids.

This solution, 40 g was placed into a 500 ml bottle and 60 g of THF was added as well as 5.2 g (4 equivalents) of dimethyl sulfide. The mixture was stirred and heated to 45° C. while small amounts of water were being introduced (about 100 ml total) over the 24 hour period. The organic solvents were removed under vacuum to obtain 100 ml of an aqueous solution. A portion of this solution (10 ml) was diluted with 50 ml of methanol and stirred with bicarbonate ion exchange resin. The resulting cloudy solution was treated with a small chunk of dry ice and the solution became clear. The ion exchange resin was then removed by filtration.

The resulting zwitterionic terpolymer solution was then applied onto glass slides and the coatings cured at 125° C. for one hour. The resulting thin films were clear, colorless, and smooth. They possessed a critical surface tension of wetting value of 15.6 dynes/cm.

The aqueous solution coating compositions reported in the above examples each wet the surface to which it was contacted to form a uniform, thin film, i.e., the coating compositions had a positive spreading coefficient.

EXAMPLE 16

Coating Utility

A potential application of the fluorocarbon-containing polymeric surfactant technology is in the area of automotive protective coating systems. In order to test this application, metal panels were obtained that possessed the same paint system that was currently utilized on automobiles. These panels were then cleaned, corona treated, and the formulated solutions of the fluorocarbon polymeric surfactant-based solutions were spread out over one-third of the surface. These solutions easily wetted the panels and showed no signs of de-wetting. The coated metal panels were air dried and then cured in the oven at 125° C. for 1 hour, to afford a clear, colorless, smooth protective polymeric coating on the metal panels. These panels were then allowed to cool to ambient temperatures before Rain Dance®, a premium car wax, was applied to one-third of the surface. The remaining third of the panel was used as a control. The various metal panels were then attached to the front license plate holders of cars located throughout the continental U.S. The cars were driven for a sufficiently long period of time so as to acquire a statistical splattering of insects onto the panel. The panels were removed from the cars and gently cleaned to determine the ease of insect removal. For the coating formulation comprised of 60 percent Zonyl TM/40® percent B-CEA and 80 percent IPO/20 percent MMA the results were impressive as one could easily discern between the treated portion and the control portion. Furthermore, the fluorocarbon polymeric surfactant-based system was also shown to be slightly superior to the Rain Dance®portion as fewer insects remained. With continued testing of these panels for up to three months, the polymeric system portion retained its gloss and non-stick ability. On the other hand, the appearance of the waxed portion became identical to the unwaxed portion and showed significant reduction in gloss and non-stick quality.

EXAMPLES 17-21

Coating Compositions Containing Hydrocarbon-Based Polymeric Surfactants

Several blends of (1) a fluorocarbon moiety/anionic moiety-containing polymeric surfactant, (2) poly-isopropenyloxazoline crosslinker and (3) a hydrocarbon-based polymeric surfactant were prepared.

Component (1) was a copolymer of a perfluorinated methacrylate (Zonyl TM®) made by duPont) and a carboxy acrylate (B-CEA®) made by Alcolac), except that Component (1) for Example 18 also included methyl acrylate Component (1) was prepared in a manner essentially the same as Example 1.

Component (2) was a copolymer of 80 weight percent isopropenyloxazoline and 20 weight percent methyl methacrylate. Component (2) was used as an 11.03 weight percent aqueous solution.

Component (3) was terpolymer of 46.5 weight percent methyl methacrylate, 20 weight percent butyl methacrylate and 33.5 weight percent carboxy acrylate (B-CEA ® made by Alcolac). Component (3) was used as a 9.36 weight percent aqueous solution.

The blends were used in a manner similar to Example 2 to prepare thin film coatings. In each case the applied blend crosslinkable composition formed a thin, uniform, film on the substrate surface, i.e., it wet the surface. Upon crosslinking the film was a hard, uniform, smooth, clear coating. The critical surface tension of each coating was measured. Table III reports the results.

TABLE III

| Example | Component (1) Composition | Component (1) Amount* | Component (2) Amount* | Component (3) Amount* | Critical Surface Tension (dynes/cm) |
|---|---|---|---|---|---|
| 17 | 60 wt. % Perfluoro. 40 wt. % Acrylate | 0.068 g | 0.301 g | 1.00 g | 10.8 |
| 18 | 40 wt. % Perfluoro. 40 wt. % Acrylate 20 wt. % Methyl Acrylate | 0.029 g | 0.151 g | 0.500 g | 10.4 |
| 19 | 40 wt. % Perfluoro. 60 wt. % Acrylate | 0.065 g | 0.301 g | 1.00 g | 9.9 |
| 20 | 60wt. % Perfluoro. 40wt. % Acrylate | 0.029 g | 0.288 g | 1.00 g | 12.7 |
| 21 | 60 wt. % Perfluoro. 40 wt. % Acrylate | 0.015 g | 0.281 g | 1.00 g | 14.3 |

*Amounts reported as grams of aqueous solution for each component. For Examples 17, 20 and 21 Component (1) was used as a 13.33 wt. % aqueous solution. For Example 18 it was 11.51 wt. % and for Example 19 it was 8.10 wt. %.

Examples 17-21 all have low critical surface tensions indicative of non-stick coatings. A Wilkinson Pencil Harness Test was conducted on the coatings of Examples 17-19: all gave a value greater than 6H.

What is claimed is:

1. A water-soluble or water-dispersible, crosslinkable reactive polymeric surfactant having (1) at least one pendant fluorocarbon moiety and (2) at least one pendant cationic moiety which is capable of reacting with a reactive counterion to form a crosslinked polymer.

2. The polymeric surfactant of claim 1 having the following formula

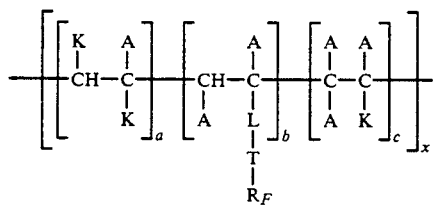

wherein A is hydrogen, alkyl, cyclic alkyl, aryl or -CN; T is a connecting group; L is a linking group; K is the ionic moiety $R_F$ is the fluorocarbon moiety; and $a+b+c=1$; and $x=5$ to 1,000.

3. The polymeric surfactant of claim 2 wherein the fluorocarbon moiety ($R_F$) is represented by the formula $C_nF_{2n+1}$ wherein $n=3$ to 18.

4. The polymeric surfactant of claim 2 wherein T is a divalent hydrocarbon-containing group.

5. The polymeric surfactant of claim 1 wherein the cationic moiety is sulfonium or reactive cyclic quaternary ammonium.

6. The polymeric surfactant of claim 1 wherein the surfactant possesses essentially equal amounts of cationic and anionic moieties.

7. A water-based crosslinkable coating composition comprising an aqueous solution of
 (a) a water-soluble or water-dispersible crosslinkable polymeric surfactant having (1) at least one pendant fluorocarbon moiety and (2) at least one pendant ionic moiety which is capable of reacting with a counterion to form a crosslinked polymer, and
 (b) a polymeric crosslinking agent having an ionic or potentially ionic moiety counterion capable of reacting with the ionic moiety of the surfactant; and
 (c) a compatible hydrocarbon based, reactive polymeric surfactant or a compatible latex-based coating composition;

said composition having the capability of forming a uniform, thin film, on a surface to be coated, and the capability, on crosslinking, to form a uniform, thin coating having a critical surface tension less than about 19 dynes/cm.

8. The coating composition of claim 7 wherein the hydrocarbon-based reactive polymeric surfactant (c) is present in an amount greater than the amount of the polymeric surfactant having pendant flurocarbon and ionic moieties (a).

* * * * *